US012075531B2

(12) United States Patent
Zissing et al.

(10) Patent No.: US 12,075,531 B2
(45) Date of Patent: Aug. 27, 2024

(54) INFRARED RADIATOR AND COMPONENT EMITTING INFRARED RADIATION

(71) Applicant: Excelitas Noblelight GmbH, Hanau (DE)

(72) Inventors: Holger Zissing, Kleinostheim (DE); Oliver Weiß, Kleinostheim (DE); Daniel Ambs, Kleinostheim (DE); Simone Rudolf, Kleinostheim (DE); Thomas Piela, Kleinostheim (DE); Frank Diehl, Kleinostheim (DE); Jürgen Weber, Kleinostheim (DE)

(73) Assignee: Excelitas Noblelight GmbH, Hanau (DE)

( * ) Notice: Subject to any disclaimer, the term of this patent is extended or adjusted under 35 U.S.C. 154(b) by 0 days.

(21) Appl. No.: 18/254,102

(22) PCT Filed: Nov. 24, 2021

(86) PCT No.: PCT/EP2021/082788
§ 371 (c)(1),
(2) Date: May 23, 2023

(87) PCT Pub. No.: WO2022/112306
PCT Pub. Date: Jun. 2, 2022

(65) Prior Publication Data

US 2023/0413391 A1 Dec. 21, 2023

(30) Foreign Application Priority Data

Nov. 26, 2020 (DE) ..................... 10 2020 131 324.1

(51) Int. Cl.
*H05B 3/44* (2006.01)

(52) U.S. Cl.
CPC ......... *H05B 3/44* (2013.01); *H05B 2203/032* (2013.01)

(58) Field of Classification Search
CPC ............................ H05B 3/44; H05B 2203/032
See application file for complete search history.

(56) References Cited

U.S. PATENT DOCUMENTS 4,377,618 A * 3/1983 Ikeda ..................... C23D 13/00 428/323
4,965,434 A * 10/1990 Nomura ................... H05B 3/44 392/407

(Continued)

FOREIGN PATENT DOCUMENTS

DE 4202944 C2 7/1994
DE 29905385 U1 8/2000

(Continued)

*Primary Examiner* — Bayan Salone
(74) *Attorney, Agent, or Firm* — Wolf, Greenfield & Sacks, P.C.

(57) ABSTRACT

Known infrared radiators have a moulded body, which has a radiation surface that emits short-wave or medium-wave infrared radiation with a first peak emission wavelength. In order to provide, proceeding therefrom, an infrared radiator with an emissions spectrum which is well matched to absorption characteristics with a maximum around 2750 nm, and which furthermore can be operated with a high electrical power density, and with which the warming-up time in industrial applications, such as, for example, drying of inks, joining of plastics or bending of glass, can be shortened, according to the invention a radiation converter material is applied to at least a part of the radiation surface and, as a consequence of heating by the infrared radiation of the first peak emission wavelength, emits infrared radiation with a second peak emission wavelength which is of a longer wavelength than the first peak emission wavelength.

11 Claims, 4 Drawing Sheets

(56) References Cited

U.S. PATENT DOCUMENTS

Figure 1:
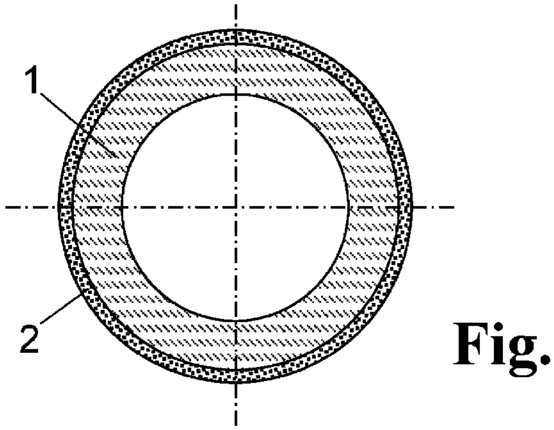

| | | | | |
|---|---|---|---|---|
| 5,905,269 | A | 5/1999 | Venkataramani et al. | |
| 6,122,438 | A * | 9/2000 | Scherzer | H05B 3/0038 392/407 |
| 11,834,362 | B2 * | 12/2023 | Mori | C23D 5/02 |
| 2006/0038470 | A1 * | 2/2006 | Maul | H05B 3/009 65/17.2 |

FOREIGN PATENT DOCUMENTS

| | | | | |
|---|---|---|---|---|
| DE | 102013104577 | B3 | 7/2014 | |
| DE | 102015119763 | A1 | 5/2017 | |
| DE | 102017004264 | A1 | 7/2018 | |
| EP | 0336436 | A2 * | 10/1989 | H05B 3/44 |
| EP | 0336436 | A2 | 10/1989 | |
| EP | 0465766 | A1 * | 1/1992 | F24C 7/043 |
| EP | 0465766 | A1 | 1/1992 | |
| GB | 1599452 | A * | 10/1981 | H05B 3/009 |
| GB | 1599452 | A | 10/1981 | |
| GB | 2081245 | A * | 2/1982 | C23D 13/00 |
| GB | 2081245 | A | 2/1982 | |
| JP | H-0359981 | A | 3/1991 | |

* cited by examiner

INFRARED RADIATOR AND COMPONENT EMITTING INFRARED RADIATION

CROSS-REFERENCE TO RELATED APPLICATIONS

This application is a National Stage filing under 35 U.S.C. § 371 of International Application Serial No. PCT/EP2021/082788, filed Nov. 24, 2021, which claims the benefit of priority to DE application number 102020131324.1, filed Nov. 26, 2020, each of which is herein incorporated by reference in its entirety.

TECHNICAL BACKGROUND

The invention relates to an infrared radiator, having a molded body, which has a radiation surface that emits short-wave or medium-wave infrared radiation with a first peak emission wavelength.

The invention moreover relates to a component that emits infrared radiation, with a base body made of a base body material, having an absorption surface for absorbing short-wave or medium-wave primary infrared radiation having a first peak emission wavelength, and a radiation surface for emitting secondary infrared radiation having a second peak emission wavelength which is of a longer wavelength than the first peak emission wavelength.

PRIOR ART

Short-wave, medium-wave, and long-wave infrared radiators are used in a wide variety of industrial manufacturing processes for heating a heating material. According to IEC 62798:2014 (p. 11, Table 1), a distinction is made between the wavelength ranges IR-A=780-1,400 nm (corresponding to a temperature between 1,800 and 3,450° C.), IR-B=1,400-3,000 nm (corresponding to a temperature between 690° C. and 1,800° C.), IR-C=3,000 nm to 1 mm (corresponding to a temperature lower than 690° C.).

The working radiation of long-wave infrared radiators is generally absorbed particularly well and quickly by the heating material, so that heating takes place with high efficiency. However, the heating and cooling behavior is slow, so that rapid temperature changes cannot be achieved. Medium-wave infrared radiators (for short: MWIR radiators) show a broadband infrared spectrum in the wavelength range of about 1,400 nm to 3,000 nm and are typically operated in the temperature range up to 1,100° C. Medium-wave radiation is absorbed already in the upper layer of the heating material and primarily heats the surface thereof. Medium-wave infrared radiators typically have an open cladding tube made of a temperature-stable glass, of metal, or of a ceramic, which surrounds a heating filament made from an oxidation-stable resistance material. One disadvantage of medium-wave radiators is their limited electrical power density of approximately 15 W/cm and their thermal inertia and associated slow reaction.

Short-wave radiation with emission wavelengths between 780 nm and 1,400 nm penetrates deeply into solid materials and ensures uniform heating. With short-wave infrared radiators (for short: SWIR radiators), a heating filament made of carbon or tungsten is embedded in a spiral or band form into a radiator tube filled with an inert gas, which tube is usually made of quartz glass. The heating filaments are connected to electrical connections which are inserted via one end or both ends of the radiator tube. The heating filaments themselves have a low thermal mass and thus a fast reaction time in the range of 1 to 2 seconds. One characteristic of SWIR radiators is their high optical power density of up to 120 watts per centimeter of heating filament (hereafter abbreviated as: W/cm). SWIR radiators are used in particular for heating powder coatings, adhesive bonds, or for rapid preheating.

US 10 2013 104 577 B3, for example, discloses the use of short-wave infrared radiators for drying and sintering metal-containing ink.

DE 299 05 385 U1 describes a device for the homogeneous heating of semi-transparent and/or transparent glasses and/or glass ceramics with the aid of infrared radiation. A proportion of more than 50% of the short-wave primary infrared radiation that is not absorbed by the heating material with a color temperature greater than 1,500° K is reflected or scattered by means of reflectors or diffusers and contributes to indirect heating.

DE 42 02 944 C2 describes a surface radiator, consisting of several infrared radiators, for the rapid heating of heating material, which, above 2,500 nm, shows high absorption. A so-called radiation converter consisting of ceramic fibers is arranged in the main direction of propagation of the primary radiation emitted by the surface radiator. The radiation converter serves as a secondary radiator, which—excited by the medium-wave or short-wave IR radiation of the surface radiator—emits secondary radiation in a longer wavelength range that overlaps more strongly with the optical absorption of the heating material. This enables rapid temperature changes with good efficiency.

DE 10 2015 119 763 A1 discloses a tile-shaped infrared surface radiator in which a substrate is in contact with a conductor track made of a resistance material. The substrate material is preferably quartz glass, into which an additional component that absorbs infrared radiation is embedded in finely-distributed form. The additional component is preferably elemental silicon.

TECHNICAL AIM

Thermal radiation with a temperature of approximately 700° C.—corresponding to a medium-wave peak emission wavelength around 2,700 nm—is absorbed particularly well by many plastics, glass, and above all water and is directly converted to heat. Medium-wave infrared radiation in this wavelength range is particularly well suited for drying applications in the printing industry, since the otherwise customary color selectivity in the drying of the various printing inks is avoided.

Recently, it has been demonstrated that IR radiation in this wavelength range also avoids color selectivity during welding or during heating and joining in the wavelength range of approximately 2,700 nm of different plastics. In particular, the heating rates of plastics of different color are virtually identical.

Moreover, the heating of glasses, e.g., for thermally-supported joining or shaping, can be carried out quickly and homogeneously with infrared radiators with high emissivity. In principle, both SWIR and MWIR radiators are suitable for these applications. The higher the electrical connection power of the infrared radiators, the faster they reach the target temperature. Increasing the electrical connection power increases the optical power density emitted by the infrared radiator, but this can also lead to a shift in the peak emission wavelength of the emitted radiation in the direction of the short-wave spectral range.

However, it is desirable for the peak emission wavelength to match the absorption characteristic of the heating material, e.g., of the printing inks, plastics, or glasses, i.e., to be, for example, at approximately 2,750 nm. The previous commercial infrared radiators either have an emission spectrum matched thereto (MWIR radiators); however, they then have low electrical connection capacity and require a comparatively large radiation surface and thus high thermal capacity for a sufficiently large optical radiation power, which high thermal capacity in turn leads to comparatively long heating and cooling times for the infrared radiator, and thus to inertness of the drying system. Or the infrared radiators have high electrical connection capacity and low inertness (SWIR radiators), but then their emission spectrum is not optimally matched to the absorption characteristic of the heating material.

The aim of the invention is to provide an infrared radiator having an emission spectrum which is well matched to a heating material with an absorption characteristic in the medium wavelength range, and which can also be operated with high electrical power density (for example, with more than 50 W/cm) and with which the warming-up time in industrial applications, such as, for example, for drying of inks, joining of plastics, or bending of glass, can be reduced.

The aim of the invention is also to specify a passive component that emits infrared radiation, the emission spectrum of which component is well matched to a heating material with an absorption characteristic in the medium wavelength range

BRIEF DESCRIPTION OF THE INVENTION

With regard to the infrared radiator, this aim is achieved according to the invention proceeding from an infrared radiator of the type mentioned at the outset in that a radiation converter material is applied to at least a part of the radiation surface and, as a consequence of heating by the infrared radiation of the first peak emission wavelength, emits infrared radiation with a second peak emission wavelength which is of a longer wavelength than the first peak emission wavelength.

Typical infrared radiator bodies have a cylindrical shape—for example, a tubular or tile shape. Tubular infrared radiators can be stretched or curved, for example, into a U-shape or ring-shape. Plate-shaped bodies have two plate sides positioned opposite each other which can be flat or curved.

The radiation surface is the surface facing the heating material; it is an integral part of the infrared radiator body.

The infrared radiator has an electrical connection and generates medium-wave or preferably short-wave infrared radiation with the first peak emission wavelength, e.g., by thermal excitation of an emitter emitting infrared radiation, such as a heating coil, a heating tape, or elemental silicon, which is embedded in a quartz glass matrix. Short-wave emitters have a somewhat faster reaction time than medium-wave emitters, which are, however, cheaper.

The short-wave or medium-wave infrared radiation of the first peak emission wavelength (hereafter also referred to as "primary radiation") emerges from the radiation surface of the infrared radiator, and is absorbed by the radiation converter material deposited there, which then heats up and emits longer-wave infrared radiation. Its peak emission wavelength (hereafter also referred to as "secondary radiation") is preferably in the range of 2,200 to 3,100 nm, particularly preferably in the range of 2,400 to 3,000 nm, and very particularly preferably in the range of 2,600 to 2,800 nm. Hereafter, the wavelength range around 2,700 nm is also referred to as the "relevant" wavelength range. The portion of the primary radiation transmitted diffusely or directly by the radiation converter material is as small as possible and is preferably less than 20%—particularly preferably less than 10%—of the emitted primary radiation.

In a first preferred embodiment, the radiation converter material is a coating material containing a color pigment or a precursor substance therefor. The coating material is, for example, a paste or a lacquer. The color pigment is thermally stable and is fixed, for example, by burning it onto the deposition surface. The color pigment can also be formed by thermal decomposition or chemical reaction of a precursor substance during or before baking.

The color pigment emits infrared radiation at least in the relevant wavelength range around 2,750 nm with an emissivity of 0.8 or more, and preferably of at least 0.9. This emissivity is particularly matched to a heating material with high absorption in this wavelength range. Depending upon the application and heating material, a color pigment can also be advantageous which has a high emissivity with an emission ratio of, for example, 0.75 or higher, and preferably of at least 0.8, even in a broader wavelength range of, for example, 2,000 nm to 8,000 nm, and in particular of 2,000 nm to 4,700 nm.

Color pigments which appear black in the visible wavelength range generally also absorb (and emit) light in the relevant infrared wavelength range. It has proven effective if the color pigment contains black mineral particles, such as, for example, copper chromite black spinel or manganese ferrite black pigment, and if it is alkali-free. The absence of alkalinity in the coating material has the advantage that a radiation surface made of glass—in particular, of quartz glass—does not devitrify, i.e., does not crystallize and lose its optical quality in contact with the coating material when heated.

In a second preferred embodiment, the radiation converter material comprises an at least partially opaque quartz glass.

Such an at least partially opaque quartz glass is described in DE 10 2004 051 846 A1 and has become known by the name, "QRC" (quartz reflective coating). It has previously been used primarily as a material for producing diffusely reflective reflector layers. The QRC reflector layer is produced by means of a slip method in which a highly-filled, pourable, aqueous $SiO_2$ slurry is produced which contains amorphous $SiO_2$ particles. This is applied as a slurry layer onto a substrate, and then the slurry layer is dried and vitrified, forming a more or less opaque quartz glass layer.

In a preferred embodiment of the invention, the molded body is formed as a cladding tube made of quartz glass, wherein the cladding tube surrounds a radiation emitter, provided with a power connection, in the form of a heating coil or a heating tape, and wherein the radiation surface forms at least part of the tube's lateral surface.

The cladding tube has, for example, a round, oval, or polygonal cross-section or is designed as a so-called twin tube radiator, which has a cross-section in the shape of a horizontal eight. The outer wall of the cladding tube is, for example, smooth, or it is roughened. Short-wave infrared radiators in particular have a piston-shaped cladding tube closed on both sides, wherein the power supply is led out at one end or at both ends.

The cladding tube has a radiation surface which is generally located on the tube's lateral surface. The cladding tube material is, for example, quartz glass and has a comparatively low inherent emissivity for infrared radiation—in particular, in the wavelength range of 2,200 to 3,100 nm. By coating it with a radiation converter material, the radiation surface is modified with regard to a higher emissivity of, for example, more than 80%, and preferably more 90%, in this wavelength range.

The infrared radiation emitted by the radiation surface reaches at least partially into the radiation converter material and from there, directly or indirectly—via a reflector—to the heating material. The radiation surface extends, for example, over a circumferential angle between 20 and 360 degrees, preferably between 60 and 200 degrees, and particularly preferably between 90 and 180 degrees, of the tube's lateral surface.

The part of the radiation surface to which the radiation converter material is applied can be up to 100%; particularly preferably, however, the surface to which the radiation converter material is applied extends over a circumferential angle between 20 and 360 degrees, preferably between and 200 degrees, and particularly preferably between 90 and 180 degrees, of the cladding tube's lateral surface.

In a particularly preferred first modification of the embodiment of the infrared radiator with a body in the shape of a cladding tube made of quartz glass, the radiation converter material comprises a lower layer made of the opaque quartz glass and an upper layer made of the color pigment-containing coating material applied to the lower layer, wherein at least part of the cladding tube's lateral surface, and preferably the entire lateral surface of the cladding tube, is covered by the lower layer, and the upper layer is applied to at least a first circumferential section of the lower layer.

The lower layer made of opaque quartz glass can, on the one hand, itself act as a radiation converter material, and, on the other, contributes to improving the adhesion of the upper layer made of the coating material.

Although the quartz glass cladding tube and the lower layer made of opaque quartz glass applied thereon absorb some of the short-wave or medium-wave primary radiation, it takes some time to bring the infrared radiator to operating temperature. The additional upper layer made of the coating material causes an increase in the emissivity in the relevant wavelength range. Furthermore, it also causes a higher absorption of the short-wave or medium-wave primary radiation and thereby enables faster heating of the infrared radiator (and thus earlier operational readiness). In addition, the energy efficiency of the infrared radiator is increased, since a larger part of the electrical energy supplied is converted to infrared radiation in the relevant wavelength range.

For this purpose, it is advantageous if the upper layer with the coating material is suitable for absorbing at least 80% of the primary radiation in the wavelength range of 1,000 to 2,500 nm. The thickness of the upper layer is less than 0.1 mm; preferably, it is in the range of 30-50 μm. The lower layer made of opaque quartz glass shows, on the one hand, a certain transmission for the short-wave or medium-wave primary radiation and, on the other, can also act as a diffuse reflector for the primary radiation. In order to reduce the transmitted portion, the lower layer made of the opaque quartz glass is, advantageously, coated in a second circumferential section by a specular reflector layer—preferably with a gold-containing reflector layer.

In order to improve the quality of the specular reflector layer, it has proven effective if the lower layer made of the opaque quartz glass is thermally densified in advance, at least in the contact area of the specular reflector layer in order to reduce or avoid open porosity there.

It is advantageous for the first circumferential section and the second circumferential section to not overlap and to preferably complement one another so as to form a circumferential angle of 360 degrees.

In this embodiment, the non-congruent surface part of the tube's lateral surface left by the upper layer free of the color pigment-containing coating material is coated with the specular reflector layer.

In a particularly preferred second modification of the embodiment of the infrared radiator with a body in the shape of a cladding tube made of quartz glass, at least part of the cladding tube's lateral surface has a surface roughness, defined as an arithmetic mean roughness $R_a$, with $R_a$ in the range of 0.5 to 5 μm, and preferably in the range of 0.8 to 3.2 μm, a first circumferential section of which forms the radiation surface to which the radiation converter material is applied. The roughness with an $R_a$ value of 0.8 μm corresponds to roughness class 6 and typically occurs during rough grinding, and the $R_a$ value of 3.2 μm corresponds to roughness class 8, which defines roughened surfaces. The lateral surface of the cladding tube is preferably roughened only where the coating material is to be applied, i.e., in the region of the radiation surface. The radiation converter material is applied to the roughened part of the tube's lateral surface. Roughening improves the adhesion of the radiation converter material—in particular, in the case of a radiation converter material in the form of a color pigment-containing coating material, such as, for example, a lacquer or a paste. Roughening of the surface is carried out, for example, mechanically or chemically, and in particular by grinding, sandblasting, or etching. In the case of a high surface roughness $R_a$ of more than 5 μm, the optical quality of the radiation surface will suffer, without significant gain in the adhesion-promoting effect. Low surface roughness $R_a$ of less than 0.5 μm will not significantly contribute to an adhesion-promoting effect.

In this embodiment, it is particularly advantageous if a reflector layer is applied to a second circumferential section of the lateral surface of the cladding tube, wherein the first circumferential section and the second circumferential section of the tube's lateral surface do not overlap, and preferably complement one another so as to form a circumferential angle of 360 degrees.

In this embodiment too, the second circumferential section, which is left free of the radiation converter material—in particular, a color pigment-containing coating material—is coated with the reflector layer. The reflector layer preferably comprises a layer made of opaque quartz glass and/or a specular, metal-based reflector layer—preferably a gold-containing layer.

In a reflector layer made of an opaque quartz glass layer and a metal-based layer, the layer made of opaque quartz glass forms the lower layer on which the metal-based layer is applied as the upper layer. In order to improve the quality of the upper layer made of the specular reflector layer, the lower layer made of the opaque quartz glass is thermally densified in advance at least in the contact area of the specular reflector layer in order to reduce or avoid open porosity there. In another particularly preferred modification of the infrared radiator, the molded body is made in the form of a tile from a material emitting infrared radiation during heating, wherein the tile has planar sides positioned opposite each other, one of which planar sides comprises the radiation surface to which the radiation converter material is applied at least partially, and wherein a heating conductor track made of a resistance material and connected to an electrical contact for the supply of a heating current is applied to the other planar side.

Tile-shaped infrared radiators are surface radiators with, generally, mostly two-dimensional emission characteristics. Hereafter, the predominantly emitting planar side is also referred to as front side, and the opposite planar side as rear side. In the infrared radiator according to the invention, the radiation converter material is applied to at least the front side completely or partially, e.g., at least 80%, at least 60%, or at least 40%. The radiation converter material is, for example, opaque quartz glass or a color pigment-containing coating material, or a combination of the two radiation converter materials, wherein the opaque quartz glass forms a lower layer, and the coating material forms an upper layer.

The tile material is preferably a ceramic—in particular, $Al_2O_3$ or $ZrO_2$—or it comprises a composite material—in particular, a matrix made of quartz glass—into which elemental silicon or carbon is embedded.

The possible size of the tile surface depends upon the properties of the material and the required dimensional stability.

Some tile materials change their color when there is an increase in temperature. This means that their emissivity, and thus the peak emission wavelength of the primary radiation, becomes shorter. Due to the coating with the radiation converter material, the emissivity changes less or does not change after an increase in temperature. Especially the color pigment-containing coating material and the opaque quartz glass do not lose or lose only little of their emissivity even at high temperatures of up to, for example, 1,100° C.

As regards the component emitting infrared radiation, proceeding from a component of the aforementioned type, the above-mentioned technical aim is achieved according to the invention in that a radiation converter material that comprises a color pigment-containing coating material is applied to at least part of the radiation surface.

The component emitting infrared radiation acts as a radiation converter. It is not an active, electrically-operated heating element; instead, the base body is heated by absorption of short-wave or medium-wave infrared radiation of an active heater. The short-wave or medium-wave primary radiation allows comparatively rapid temperature changes. On the other hand, as a result of the heating of the base body, the component emits secondary infrared radiation in the longer wavelength range, which is better matched to the absorption characteristic of the heating material.

The base body is present, for example, in the form of a tube, piston, chamber, half-shell, spherical or ellipsoidal segment, plate, or the like.

The absorption surface for absorption of short-wave or medium-wave primary infrared radiation can differ from the radiation surface for emission of secondary infrared radiation, or these surfaces can completely or partially coincide.

Since color pigments which appear black in the visible wavelength range generally also absorb (and emit) light in the relevant infrared wavelength range, the color pigment-containing coating material of the radiation converter material preferably contains a color pigment with black mineral particles such as, for example, copper chromite black spinel or manganese-ferrite black pigment, and it is alkali-free.

Freedom from alkali has advantages particularly in the case of a base body made of glass or quartz glass since this prevents the change and damage to the surface area of the base body by devitrification.

A component in which the radiation converter material comprises opaque quartz glass in addition to the color pigment-containing coating material is particularly advantageous.

The two radiation converter materials complement one another in their emissivity, and the opaque quartz glass can act as an adhesion promoter for the coating material particularly in the case of a base body made of quartz glass. Here, the radiation converter material is a combination of the two radiation converter materials, wherein the opaque quartz glass forms a lower layer, and the coating material forms an upper layer.

Although the base body and the lower layer made of opaque quartz glass applied thereon absorb some of the short-wave or medium-wave primary radiation, it takes some time to bring the component to operating temperature. The additional upper layer made of the coating material causes an increase in the emissivity in the relevant infrared wavelength range. Furthermore, it also causes a higher absorption of the short-wave or medium-wave primary radiation and thereby enables faster heating of the component (and thus earlier operational readiness).

For this purpose, it is advantageous if the upper layer with the coating material is suitable for absorbing at least 80% of the primary radiation in the wavelength range from 1,000 to 2,500 nm. The thickness of the upper layer is less than 0.1 mm, and preferably is in the range of 30-50 μm.

Definitions

Mean Roughness $R_a$

The arithmetic mean roughness $R_a$ is determined in accordance with EN ISO 25178. This is a line roughness parameter. To determine the measured value $R_a$, the surface area of a defined measured distance is scanned (with a fine needle), and all differences in elevation and depth of the surface area are recorded. After calculating the specific integral of this roughness profile on the measured distance, the result is divided by the length of the measured distance.

Radiation Surface

From the radiation surface, the useful radiation reaches the heating material directly or indirectly via a reflector.

Peak Emission Wavelength

It defines the maximum of the spectral distribution of the emitted radiation.

DETAILED DESCRIPTION OF THE INVENTION

Figure 2A:
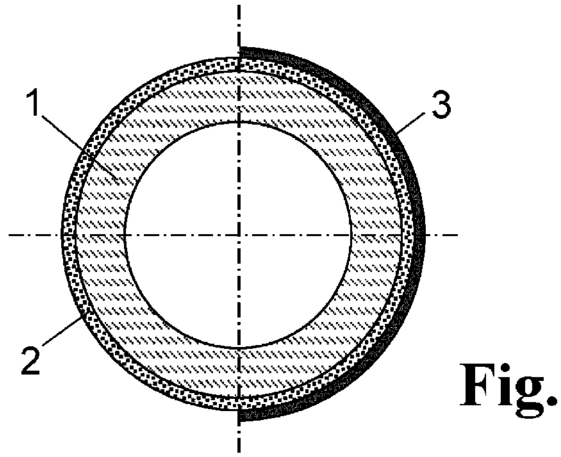
Figure 2B:
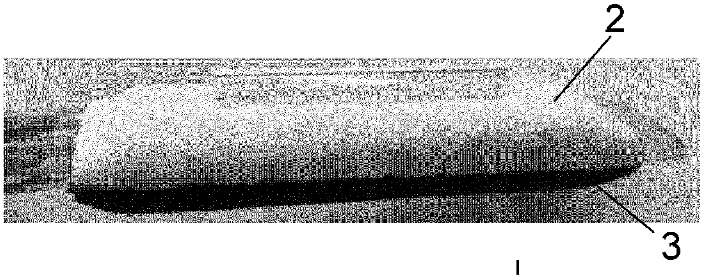

The invention is explained in more detail below with reference to an exemplary embodiment and a drawing. The following are shown in detail:

FIG. 1 a cross-sectional and schematic view of an embodiment of a short-wave quartz tube radiator, a radiation converter material being applied to the cladding tube on the outside;

FIG. 2*a* a schematic view of a further embodiment of a short-wave quartz tube radiator based upon the base form shown in FIG. 1;

FIG. 2*b* a photograph of the embodiment of the short-wave quartz tube radiator according to FIG. 2*a;*

Figure 3:
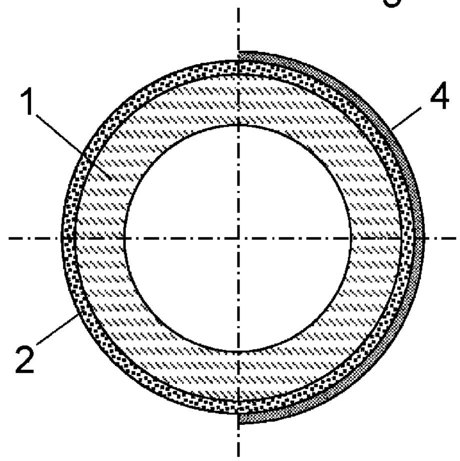
Figure 4:
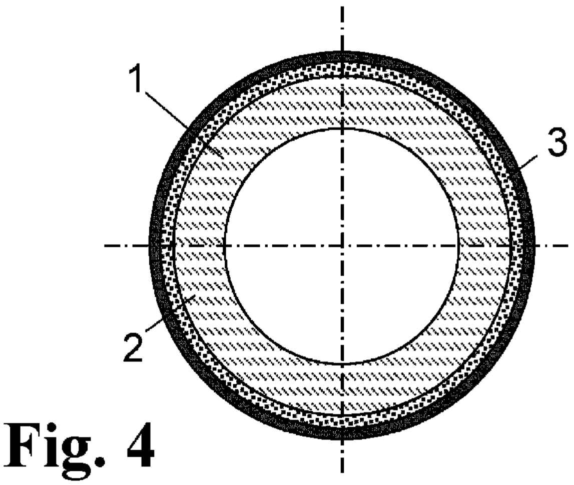
Figure 5:
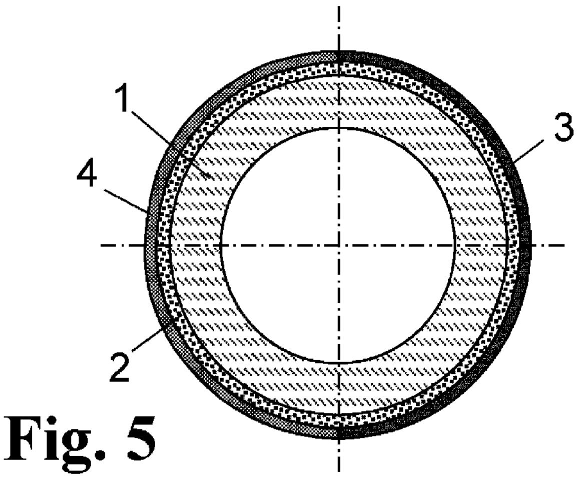

FIGS. 3 through 5 further embodiments of a short-wave quartz tube radiator based upon the base form shown in FIG. 1.

Figure 6:
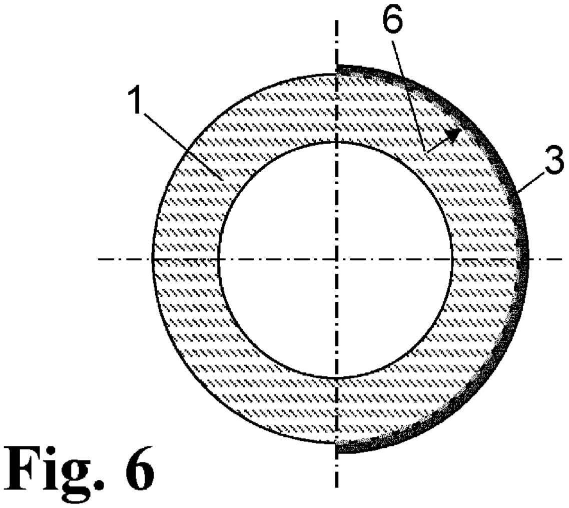
Figure 7:
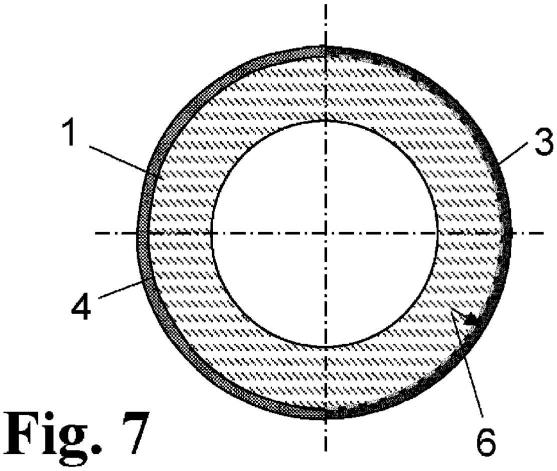
Figure 8:
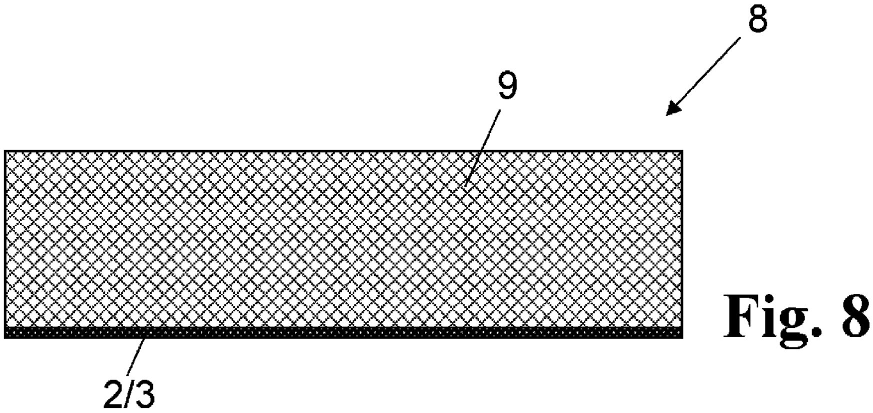
Figure 9:
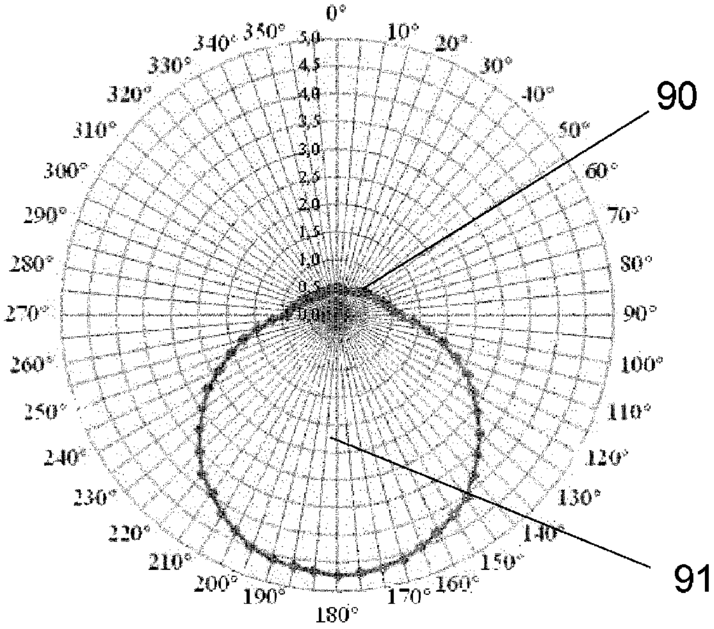
Figure 10:
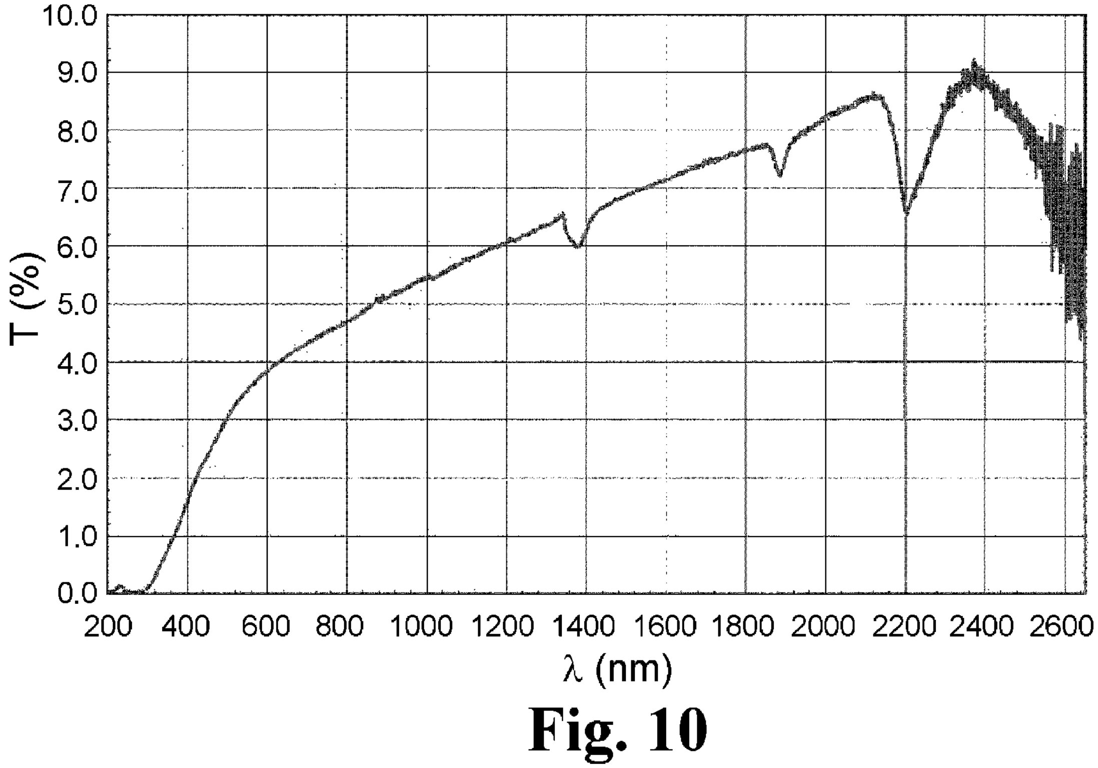
Figure 11:
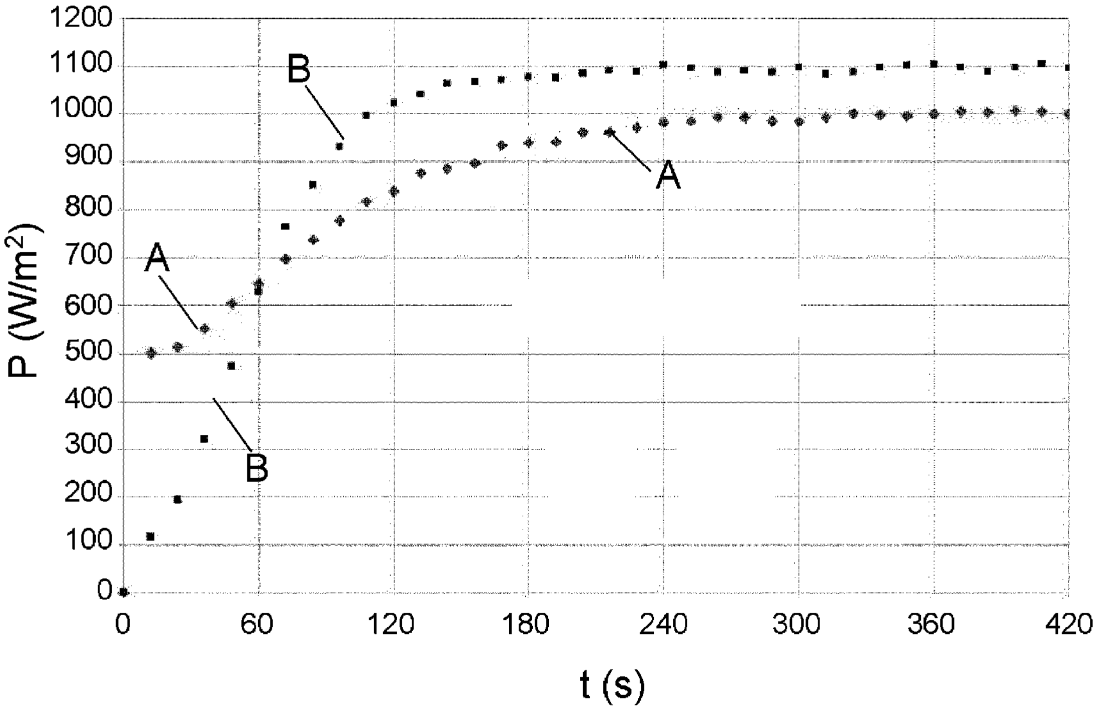

FIGS. 6 and 7 a cross-sectional and schematic view of further embodiments of a short-wave quartz tube radiator, a radiation converter material being applied to the cladding tube on the outside;

FIG. 8 a cross-sectional and schematic view of an embodiment of a tile-shaped infrared radiator, a radiation converter material being applied to the radiation surface;

FIG. 9 a diagram of the radial emission of a short-wave quartz tube radiator according to FIG. 7;

FIG. 10 a diagram of the diffuse and direct transmission of a short-wave quartz tube radiator according to FIG. 1; and FIG. 11 a diagram with the result of measurements, over time, of the irradiance in the case of a short-wave quartz tube radiator according to FIG. 1 as compared to a short-wave quartz tube radiator according to FIG. 4.

FIG. 1 shows schematically a first basic variant of the infrared radiator according to the invention. It is a short-wave infrared radiator with a lamp tube 1 made of quartz glass. The lamp tube 1 is closed on both sides and surrounds a tungsten heating wire (not shown), which is provided with an electrical connection and can be heated to temperatures up to 2,300° C. The lateral surface of the lamp tube is coated completely (360 degrees) with a QRC layer 2 made of opaque quartz glass, which acts as radiation converter material.

The QRC layer 2 on the outer lateral surface of the lamp tube 1 is produced in accordance with the known slip method described in DE 10 2004 051 846 A1. Here, the pourable, aqueous $SiO_2$ slurry is applied as a slurry layer onto the lamp tube 1, and the slurry layer is then dried and vitrified to form the QRC layer 2. It consists of porous opaque quartz glass. It has a density of about 2.15 g/cm$^3$ and a mean layer thickness in the range of 0.5 to 2 mm. Its surface area is open-pored, as shown by a color penetration test.

The QRC layer 2 converts the short-wave primary radiation of the infrared radiator into longer wave, secondary radiation with a peak emission wavelength of approximately 2,750 nm. As a result, it is possible to operate the short-wave infrared radiator with an emission spectrum that is well matched to the heating application at 700 to 800° C. and to enable rapid temperature changes and nevertheless achieve a high electrical power density of more than 50 W/cm—for example, of at least 120 W/cm.

The electrical power density in the unit, "electrical power per heated length" (W/cm), is almost 100% converted to optical power (W/m$^2$). A power density of a short-wave infrared radiator with, for example, 120 W/cm is converted to primary radiation with a first peak emission wavelength and, by the use of the radiation converter material such as, for example, the QRC layer 2, to medium-wave infrared radiation with a peak emission wavelength which is of a longer wavelength; for example, at a distance of 200 mm (from the heating filament), approximately 1.2 kW/m$^2$ in total arrives at the detector.

The entire lateral surface of the cladding tube acts as a radiation surface, i.e., the infrared radiator has a three-dimensional emission characteristic.

FIGS. 2 through 5 show modifications of the basic variant of FIG. 1 with additional layers. The representations are not to scale; in particular, the thicknesses of the additional layers can be shown thicker to improve recognizability.

In the modification of the basic variant shown in FIG. 2*a*, half (front side) of the QRC layer 2 (180 degrees) is blackened by being coated with a lacquer layer 3 made of a temperature-stable black lacquer. The radiation surface corresponds here to the lamp tube's lateral surface coated with the blackened lacquer layer 3. The lacquer layer retains its black color—and thus also its emission spectrum—even during heating to 800° C. and beyond.

The lacquer layer 3 is produced by spraying or brushing on a thermal paint. The thermal paint is alkali-free. It contains an alumino-silicate solution (10 to 20 wt %), copper chromite black spinel as mineral color pigment (25 to 35 wt %), and water (40 to 60 wt %). Suitable thermal paints are offered as oven paints by, for example, the companies ULFALUX Lackfabrikation GmbH and Aremco Products, Inc., wherein the following are indicated as further organic ingredients: xylene, ethyl acetate, butyl acetate, ethyl benzene.

Multiple painting ensures a completely closed layer. After spraying, the thermal paint is dried at 250° C. and is then touch-resistant. The final state is achieved by heating the lacquer layer 3 to 1,200° C. Such heating can take place when putting the infrared radiator into operation. Ceramic components are sintered onto the lamp tube's surface or onto the surface of the QRC layer to produce a solid substance-to-substance bond so that the lacquer layer 3 is largely scratch-resistant. The lacquer layer 3 is approximately 40 μm thick. The manufacturer has specified the emissivity of the lacquer layer 3 to be above 90% at 800° C.

The QRC layer 2 lying underneath the lacquer layer 3 generally shows open porosity and acts as an adhesion promoter. By flame polishing the surface of the QRC layer 2, the lacquer can be prevented from penetrating into the porous surface structure, as a result of which a visually more appealing surface structuring is achieved. The fire polishing takes place by heating the QRC layer 2 with an oxyhydrogen burner. As a result, very high temperatures around 1,800° C. are produced locally, which enables the production of a glass film as thin as possible within a few seconds, which seals the porous surface.

During operation, the thin black lacquer layer 3 heats up to 700-750° C. within a few seconds and thus emits infrared radiation in a medium-wave range (preferably in the wavelength range of 2,500 to 3,500 nm). The following applies: "absorption=emission"; i.e., the short-wave radiation emitted on by the lamp tube 1 and rapidly absorbed in the lacquer layer 3 releases the virtually identical energy with high intensity just as quickly, but at a lower temperature (i.e., in the medium-wave range). The black lacquer layer 3 acts as a radiation converter in that it converts high-energy short-wave radiation to medium-wave radiation of high intensity. Rapid energy supply response times in the seconds range are possible as a result of the short-wave tungsten heating filament.

The photograph of FIG. 2*b* shows the embodiment of the infrared radiator of FIG. 2*a* in a three-dimensional view. In addition, the electrical connections 1*a* led out at one end of the lamp tube 1 can be seen here.

In the modification of the basic variant shown in FIG. 3, half of the QRC layer 2 (180 degrees) is coated with a rear-side reflector layer in the form of a gold layer 4.

The gold layer 4 is produced by applying, with a brush, a gold-containing emulsion (gold resinate) onto the surface of the QRC layer 2, which is open-pored or which has been sealed by thermal treatment. The emulsion is subsequently baked by heating. During baking, the gold resinate resolves into metallic gold and resin acid which, like the other components of the paste, are volatilized by the high baking temperature. What remains is a closed, specular gold layer 4 that acts as a reflector and whose thickness is preferably in the range of 50 to 300 nm, depending upon the reflectance requirement. The thicker the layer, the higher the reflectance. Here, the radiation surface corresponds to half (180 degrees) of the lamp tube's lateral surface coated by the QRC layer 2 but not by the gold layer 4.

The gold layer 4 reduces the emissivity in the region of the lamp tube's rear side and effects a very good reflection of the radiation, which is reflected forwards onto the lacquer layer 3 and absorbed there. This amount of radiation contributes considerably to the rapid heating of the black lacquer layer 3.

In the modification of the basic variant shown in FIG. 4, the entire QRC layer 2 (360 degrees) is coated with a 0.04 mm thick lacquer layer 3 made of thermal paint (production and properties are explained with reference to FIG. 2). The entire lateral surface of the cladding tube acts as a radiation surface, i.e., the infrared radiator has a three-dimensional emission characteristic. In the modification of the basic variant shown in FIG. 5, one half of the surface of the QRC layer 2 (180 degrees) is coated with a 0.04 mm thick lacquer layer 3 made of thermal paint (production and properties are explained with reference to FIG. 2), and the non-congruent half of the surface (180 degrees) is coated with a 0.1 mm thick gold layer 4 (production and properties are explained with reference to FIG. 3). Here, the radiation surface corresponds to half (180 degrees) of the lamp tube's lateral surface, which is coated by the lacquer layer 3 but not by the gold layer 4.

FIG. 6 shows schematically a first basic variant of the infrared radiator according to the invention. This too is a short-wave infrared radiator with a lamp tube 1 made of quartz glass.

The lamp tube 1 is closed on both sides and surrounds a tungsten heating wire (not shown), which is provided with an electrical connection and can be heated to temperatures up to 2,300° C.—in the case of halogen radiators up to 3,000° C.—and predominantly emits in the short-wave range.

Typical infrared radiators with a quartz tube have a gold reflector or a diffuse reflector made of QRC or ceramic on their rear side in order to bring the radiation energy forwards into the heating material via the radiation surface of the transparent quartz glass lamp tube 1.

In this embodiment of the infrared radiator, one half of the lateral surface of the lamp tube 1 (180 degrees) is blackened by being coated with a lacquer layer 3 made of a temperature-stable black lacquer (production and properties are explained with reference to FIG. 2). The radiation surface corresponds here to the lamp tube's lateral surface coated with the blackened lacquer layer 3. In another embodiment (not shown) of the infrared radiator, the entire lateral surface of the lamp tube 1 (360 degrees) is blackened.

On a smooth lateral surface of the lamp tube, the black lacquer layer 3 may, under certain circumstances, flake off at high temperature over a few hundred hours. To improve the adhesion of the lacquer layer 3, the lamp tube's surface is roughened. The region of the roughening 6 is symbolized by a dashed line.

Roughening is carried out mechanically by sandblasting or grinding, or chemically by treatment with an etching solution. A suitable etching solution ($NH_4$+HF+acetic acid) and its application for roughening a quartz glass surface are described in DE 197 13 014 C2. The mean roughness depth $R_a$ is preferably in the range of 0.8-3.2 μm; in the exemplary embodiment, it is 3 μm. Roughening 6 not only brings about a better bond between the lacquer layer 3 and the lamp tube's surface, but also an even more homogeneous distribution of the medium-wave radiation by scattering the radiation at the roughened surface. The radial distribution of the converted radiation is distributed very uniformly to the front and over half the circumference of the quartz tube (see radial distribution according to FIG. 9).

The black lacquer layer 3 acts as a radiation converter and emits in the medium-wave range at temperatures in the range of 700 to 750° C. Endurance tests have shown that the lacquer layer or the infrared radiator can achieve a service life of up to 10,000 hours in the absence of visual or functional impairments.

The heating of the lacquer layer 3 to about 700° C., i.e., up to medium-wave emission at approximately 3 μm, takes approximately 10 s. In comparison, standard medium-wave infrared radiators require approximately 5 min to reach thermal equilibrium.

In the modification shown in FIG. 7 of the second basic variant according to FIG. 6, the half of the lamp tube's surface (180 degrees) that is not coated by the lacquer layer 3 is with a 0.1 mm thick gold layer 4 (production and properties are explained with reference to FIG. 3). Here, the radiation surface corresponds to half (180 degrees) of the lamp tube's lateral surface, which is coated by the lacquer layer 3 but not by the gold layer 4.

FIG. 8 shows schematically a planar, tile-shaped infrared radiator 8 made of a composite material of quartz glass and elemental silicon embedded therein, as described in DE 10 2015 119 763 A1. A heating conductor track (not shown) is applied to the tile-shaped base body 9 of the infrared surface radiator 8 and heats the base body during current flow, so that the latter emits infrared radiation. Such infrared radiators 8 reach an emissivity of approximately 0.82 at a wavelength of 2.75 μm at a temperature of 1,000° C. This wavelength represents the peak wavelength at this temperature. The composite material loses its high emissivity as the temperature drops. To counteract this, a layer 10 made of a radiation converter material is applied to the radiation surface.

In one embodiment, this is a QRC layer 2. The production and properties of which are explained with reference to FIG. 1. Another embodiment is a lacquer layer 3. The production and properties of which are explained with reference to FIG. 3. Or, in a third embodiment, it is a combination of a lower layer that is a QRC layer 2, and an upper layer that is a lacquer layer 3. In FIG. 8, these possible combination are symbolized by the combined reference number 2/3. The coating of the radiation surface with a layer made of radiation converter material makes it possible for a high emissivity to be maintained, regardless of the temperature of the base body 9. In this way, the already high efficiency of the tile-shaped infrared radiator is further increased, since the emissivity is high even at lower temperatures, and energy transmission can thus be carried out in the best possible manner.

The tile 9 has plate sizes of up to 400×400 $mm^2$, with a thickness of up to 2 mm. Alternatively, the tile 9 consists of ceramic material, such as aluminum oxide or zirconium oxide. The thermal excitation of the ceramic is made possible by means of resistance heaters. A lacquer layer 3 is applied to the radiation surface of the tile 9 (production and properties are explained with reference to FIG. 3). The lacquer layer 3 emits the majority of the absorbed energy by means of radiation. The temperature of the ceramic tile 8 determines the peak emission wavelength. Temperatures up to 1,100° C. can be reached. With ceramic tiles, even larger dimensions than the above-mentioned, as well as curved geometries, are particularly easy to realize.

A radial measurement was carried out to determine the effect that the radiation converter material has on the radial distribution of the emitted optical power density (irradiance). Radial measurement is carried out in the usual manner using an infrared radiator mounted onto a rotatable support, which rotates by 360 degrees in 5-degree increments. A thermopile sensor mounted at a distance of 25 cm detects the radiation emitted by the infrared radiator. In the diagram of FIG. 9, on the circle radius, the normalized irradiance (rel. unit) is plotted against the circumferential angle position (in degrees) of the measuring points. The measurement curve shows the result of the radial measurement for an infrared radiator according to FIG. 7 with a lacquer layer 3 on the front side (radiation surface) and a specular gold layer 4 on the rear side.

In the rear radiator chamber 90, the measurement curve A shows a small proportion of irradiation intensity. This is composed of transmitted primary radiation and of secondary radiation, which is due to the heating of the gold layer 4. In the actual irradiation field 91, however, the measurement curve shows a high irradiance and a homogeneous distribution of the medium-wave radiation. The radial distribution of the converted radiation is distributed uniformly to the front and over half the circumference of the quartz tube.

In the diagram of FIG. 10 relating to the transmission of a short-wave quartz tube radiator according to FIG. 1, the total transmission T (in %) determined per Ulbricht sphere is plotted against the wavelength A (in nm). The Ulbricht sphere allows the measurement of the direct hemispherical spectral transmittance that comprises diffuse and direct transmission.

It is found that, after the infrared radiator has been switched on, a significant amount of the primary radiation is emitted by transmission through the QRC layer 2 due to multiple reflections. The non-transmitted radiation heats the quartz glass casing tube 1 together with the QRC layer 2 over time, and thus additionally generates secondary radiation in the medium-wave range. Thermal equilibrium is reached after a few minutes, and the infrared radiator emits a broadband spectrum consisting of short-wave primary and medium-wave secondary radiation.

The diagram of FIG. 11 shows measurements, over time, for an infrared radiator according to FIG. 1 in comparison to an infrared radiator according to FIG. 4. The optical power P (in $W/m^2$) is plotted on the y-axis against the power-on time t (in s) which is plotted on the x-axis. A measurement, over time, of the irradiance shows that the infrared radiator (FIG. 1) coated only with a QRC layer 2 generates approximately 50% of the maximum irradiance directly after being switched on. It then takes approximately 4 minutes until full optical power is reached. In the case of the infrared radiator (FIG. 4), which is additionally completely blackened by means of the lacquer layer 3, the irradiance rises more slowly, but reaches the maximum power earlier, after about 3 min., due to the higher absorption. Above all, the rapid availability of some of the total optical power is advantageous for the application in the printing industry because the use of shutter systems for shading the paper web against the infrared radiators, which are still hot despite having been turned off, can be dispensed with.

In the case of the tile-shaped infrared radiators of the invention, which are explained with reference to FIG. 8, a heating conductor track is provided on one of the plate sides of the tile, said heating conductor track generating heat in the event of a current flow and delivering said heat to the tile by heat conduction, thereby heating the tile. The described tiles without the heating conductor track can be used as passive—current-free—heating elements if they are heated by an external heating source emitting medium-wave or short-wave infrared radiation instead of by the heating conductor track. The coatings with the radiation converter material may have the same effect, as explained above—for example, with reference to FIG. 8.

The invention claimed is:

1. An infrared radiator having a molded body which has a radiation surface that emits short-wave or medium-wave infrared radiation with a first peak emission wavelength, wherein a radiation converter material is applied to at least a part of the radiation surface and, as a consequence of heating by the infrared radiation of the first peak emission wavelength, emits infrared radiation with a second peak emission wavelength which is of a longer wavelength than the first peak emission wavelength, wherein the radiation converter material comprises:

a lower layer made of opaque quartz glass; and an upper layer made of a color pigment-containing coating material and applied to the lower layer, wherein:

at least part of a lateral surface of the molded body is covered by the lower layer, and at least one first circumferential section of the lower layer is coated by the upper layer.

2. The infrared radiator according to claim 1, wherein the color pigment-containing coating material contains black mineral particles and is alkali-free.

3. The infrared radiator according to claim 1, wherein the molded body is formed as a cladding tube made of quartz glass which surrounds a radiation emitter, provided with a power connection, in the form of a heating coil or a heating tape, wherein the radiation surface forms at least part of a lateral surface of the cladding tube.

4. The infrared radiator according to claim 3, wherein the radiation surface extends over a circumferential angle between 20° and 360°, preferably between 60° and 200°, and particularly preferably between 90° and 180° of the lateral surface of the cladding tube.

5. The infrared radiator according to claim 1, wherein a specular reflector layer—preferably a gold-containing reflector layer is applied in a second circumferential section to the lower layer made of the opaque quartz glass.

6. The infrared radiator according to claim 5, wherein the at least one first circumferential section and the second circumferential section do not overlap and preferably complement one another to form a circumferential angle of 360 degrees.

7. The infrared radiator according to claim 1, wherein the molded body is made in a form of a tile from a material emitting infrared radiation during heating, wherein the tile has planar sides positioned opposite each other, one of which planar sides comprises the radiation surface to which the radiation converter material is applied at least partially, and wherein a heating conductor track made of a resistance material and connected to an electrical contact for a supply of a heating current is applied to the other planar side.

8. The infrared radiator according to claim 7, wherein the tile material comprises a ceramic—in particular, $Al_2O_3$ or $ZrO_2$—or in that the tile material comprises a composite material—in particular, a matrix made of quartz glass—into which elemental silicon or carbon is embedded.

9. A component emitting infrared radiation, with a base body made of a base body material, having an absorption surface for absorbing short-wave or medium-wave primary infrared radiation having a first peak emission wavelength, and a radiation surface for emitting secondary infrared radiation having a second peak emission wavelength which is of a longer wavelength than the first peak emission wavelength, wherein a radiation converter material is applied to at least a part of the radiation surface, the radiation converter material comprising:

a lower layer made of opaque quartz glass; and an upper layer made of a color pigment-containing coating material and applied to the lower layer, wherein:

at least part of a lateral surface of the base body is covered by the lower layer, and at least one first circumferential section of the lower layer is coated by the upper layer.

10. The component according to claim 9, wherein the color pigment-containing coating material contains black mineral particles and is alkali-free.

11. The component according to claim 9, wherein the base body material is quartz glass.

* * * * *